United States Patent [19]
Sato et al.

[11] Patent Number: 5,745,858
[45] Date of Patent: Apr. 28, 1998

[54] BASE STATION TRANSMITTER/RECEIVER CAPABLE OF VARYING COMPOSITE DIRECTIVITY OF ANTENNAS

[75] Inventors: Toshifumi Sato; Yukitsuna Furuya, both of Tokyo, Japan

[73] Assignee: NEC Corporation, Tokyo, Japan

[21] Appl. No.: 337,835

[22] Filed: Nov. 8, 1994

[30] Foreign Application Priority Data

Nov. 8, 1993 [JP] Japan ................................. 5-278606

[51] Int. Cl.$^6$ ........................................................ H04Q 7/30
[52] U.S. Cl. ............................. 455/562; 455/63; 455/138
[58] Field of Search .......................... 455/63, 33.1, 101, 455/137, 138, 273, 531, 33.3, 422, 561, 562; 379/59; 375/347, 267; 342/368, 377

[56] References Cited

U.S. PATENT DOCUMENTS

| | | | |
|---|---|---|---|
| 4,128,740 | 12/1978 | Graziano | 455/33.1 |
| 4,932,049 | 6/1990 | Lee | 455/33.3 |
| 5,193,109 | 3/1993 | Lee | 455/33.3 |
| 5,274,844 | 12/1993 | Harrison et al. | 455/33.3 |
| 5,437,055 | 7/1995 | Wheatly, III | 455/33.3 |
| 5,485,631 | 1/1996 | Bruckert | 455/33.4 |
| 5,615,409 | 3/1997 | Forssen et al. | 455/562 |

OTHER PUBLICATIONS

*Digital Mobile Communication*; (Edited by Kuwahara, Science Newspaper Company in Japan, 1992, Sep.).

*Primary Examiner*—Edward F. Urban
*Attorney, Agent, or Firm*—Sughrue, Mion, Zinn, Macpeak & Seas, PLLC

[57] ABSTRACT

In a base station transmitter/receiver of a cellular system, a plurality of antennas are oriented in each sector and radiate radio transmission signals and receive radio reception signals to produce received signals. A signal processing circuit is connected to the antennas to process the received signals into output reception signal and to process input transmission signal into the radio transmission signals in response to the received signal. Thus, the signal processing circuit serves to vary the directivities of the antennas in each sector and to thereby control a composite directivity formed by the varied directivities.

9 Claims, 6 Drawing Sheets

BASE STATION TRANSMITTER/RECEIVER CAPABLE OF VARYING COMPOSITE DIRECTIVITY OF ANTENNAS

BACKGROUND OF THE INVENTION

This invention relates to a base station transmitter/receiver which is used in a cellular system, such as a mobile telephone system or a portable telephone system. It is to be noted in the instant specification that the cellular system adopts a dynamic channel arrangement method which can dynamically change channels from one to another.

In the cellular system, a service area is divided into a plurality of cells. A base station is installed in each of the cells in order to communicate with mobile stations located in each cell. In addition, each cell is also divided into a plurality of sectors, for example, three or six sectors.

A conventional transmitter/receiver which is used in the station and which will be called a base station transmitter/receiver comprises a transmitting/receiving antenna and a diversity-receiving antenna both of which are oriented to each sector in the cell. The transmitting/receiving antenna has a directivity which can cover the entire sector and which is fixed in a given direction. Thus, the transmitting-receiving antenna radiates a transmitting signal toward entire the sector, regardless of the location of the mobile station located in the each sector. Therefore, if a carrier frequency is assigned to two adjacent cells, occurrence of a cochannel interference can not be avoided at and around a boundary of the two adjacent cells.

Accordingly, the same carrier frequency should not be assigned to the two adjacent cells. In other words, the same carrier frequency must be assigned to cells which are remote from the cell in question by four or seven cells. This brings about degradation of utilization efficiency of carrier frequencies.

SUMMARY OF THE INVENTION

It is therefore an object of this invention to provide a base station transmitter/receiver which has antennas and which is capable of avoiding a cochannel interference.

It is another object of this invention to provide a base station transmitter/receiver of the type described that can effectively utilize carrier frequencies.

It is a different object of this invention to provide a base station transmitter/receiver which is capable of smoothly tracing a mobile station within each sector of a cell.

Other objects of this invention will become clear as the description proceeds.

On describing the gist of this invention, it is possible to understand that a base station transmitter/receiver is used in a cellular system and is installed in each cell of a service area. Each cell is divided into a plurality of sectors by the base station transmitter/receiver. The base station transmitter/receiver transmits radio transmission signals in each sector in response to an input transmission signal and receives radio reception signals in each sector to produce an output reception signal.

According to the above-mentioned aspect of this invention, the base station transmitter/receiver comprises a plurality of antennas which are arranged in each sector and have directivities different from one another. The plurality of antennas radiate the radio transmission signals and receive the radio reception signals to produce received signals. Signal processing means is connected to the antennas The signal processing means processes the received signals into the output reception signal. The signal processing means processes the input transmission signal into the radio transmission signals in response to the received signals to vary the directivities of the antennas and to thereby control a composite directivity formed by the varied directivities.

DESCRIPTION OF THE PREFERRED EMBODIMENT

Figure 1:
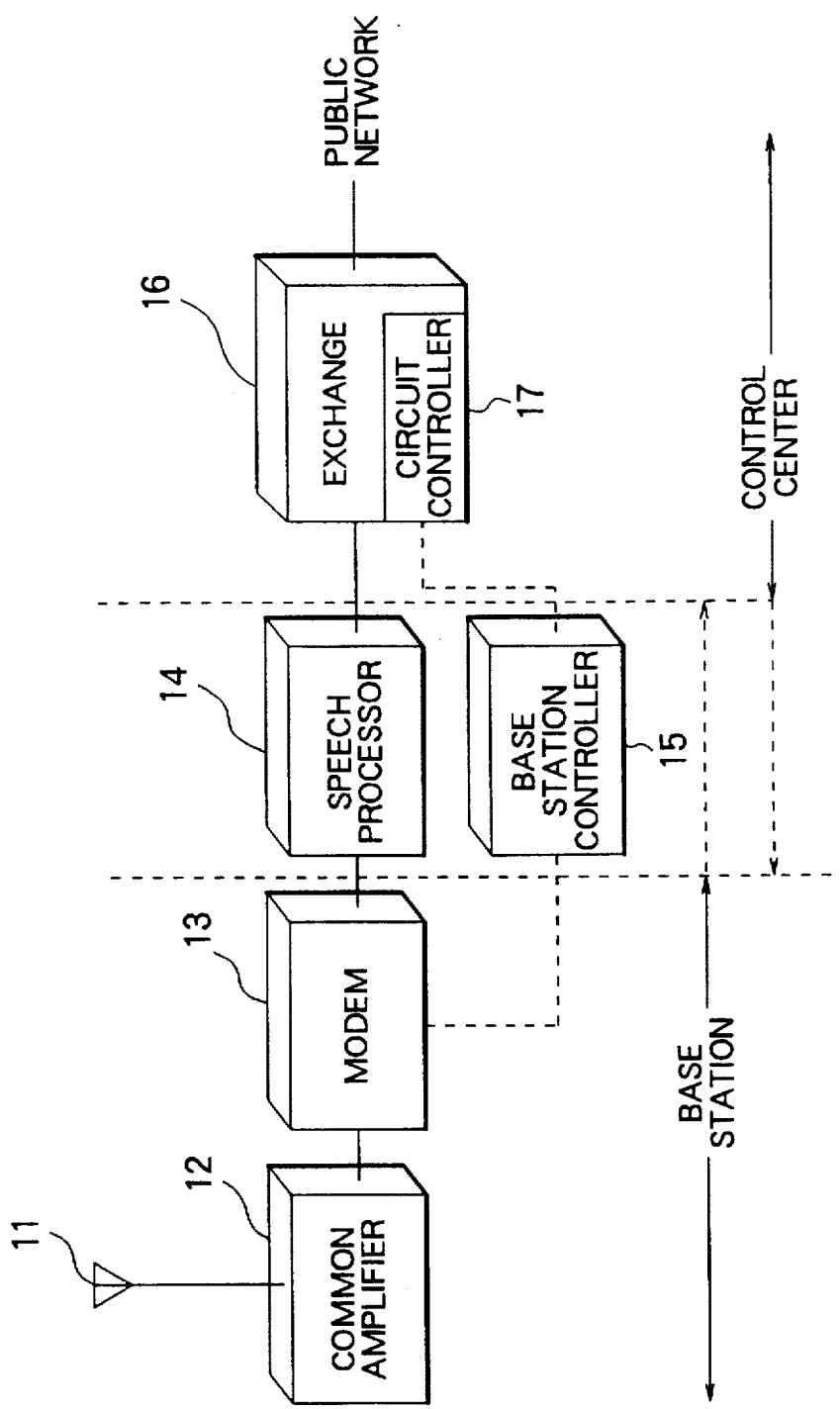
FIG. 1 is a block diagram of a general base station of a cellular system.
Figure 2:
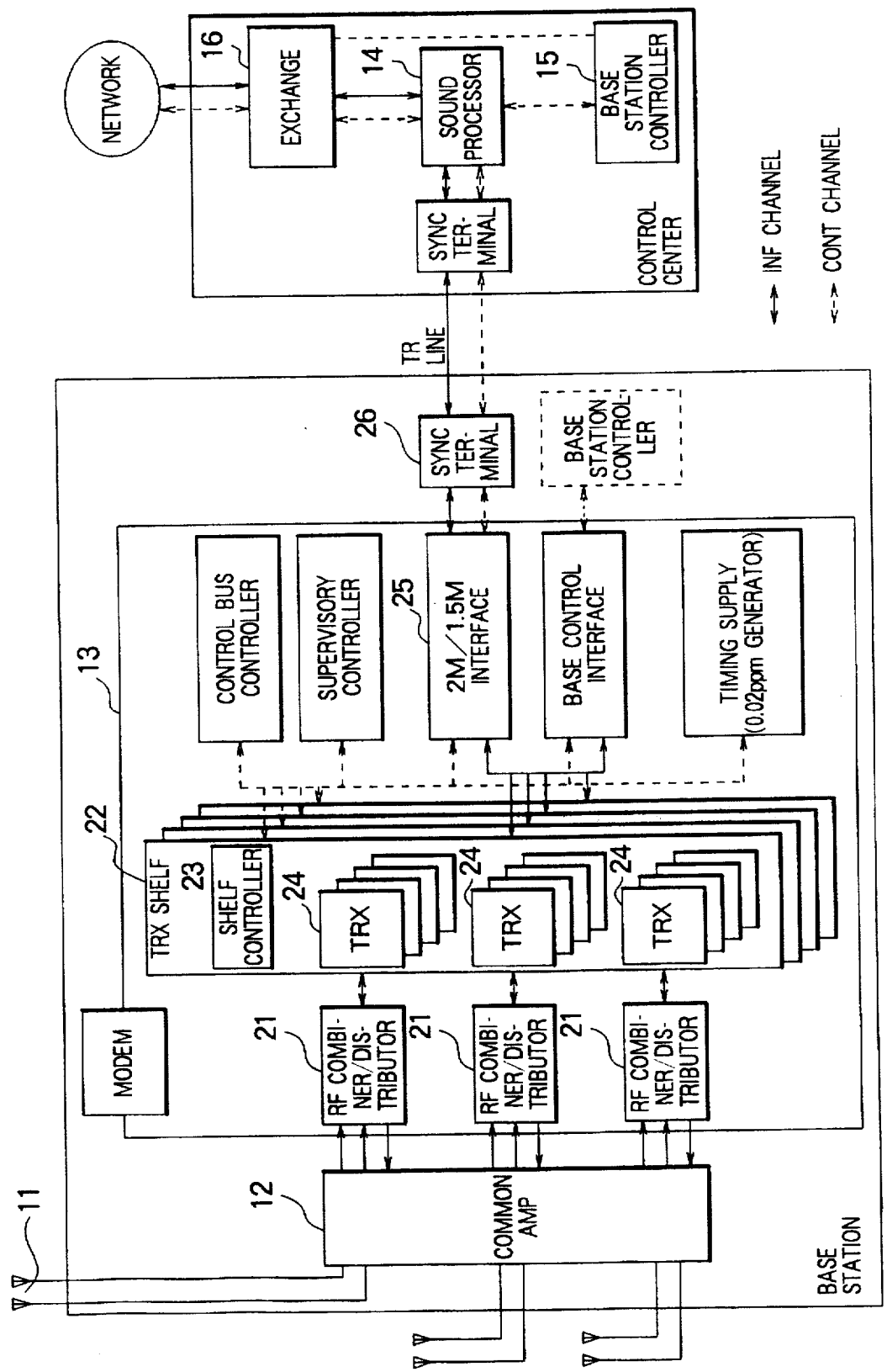
FIG. 2 is a block diagram of a conventional base station transmitter/receiver.
Figure 3:
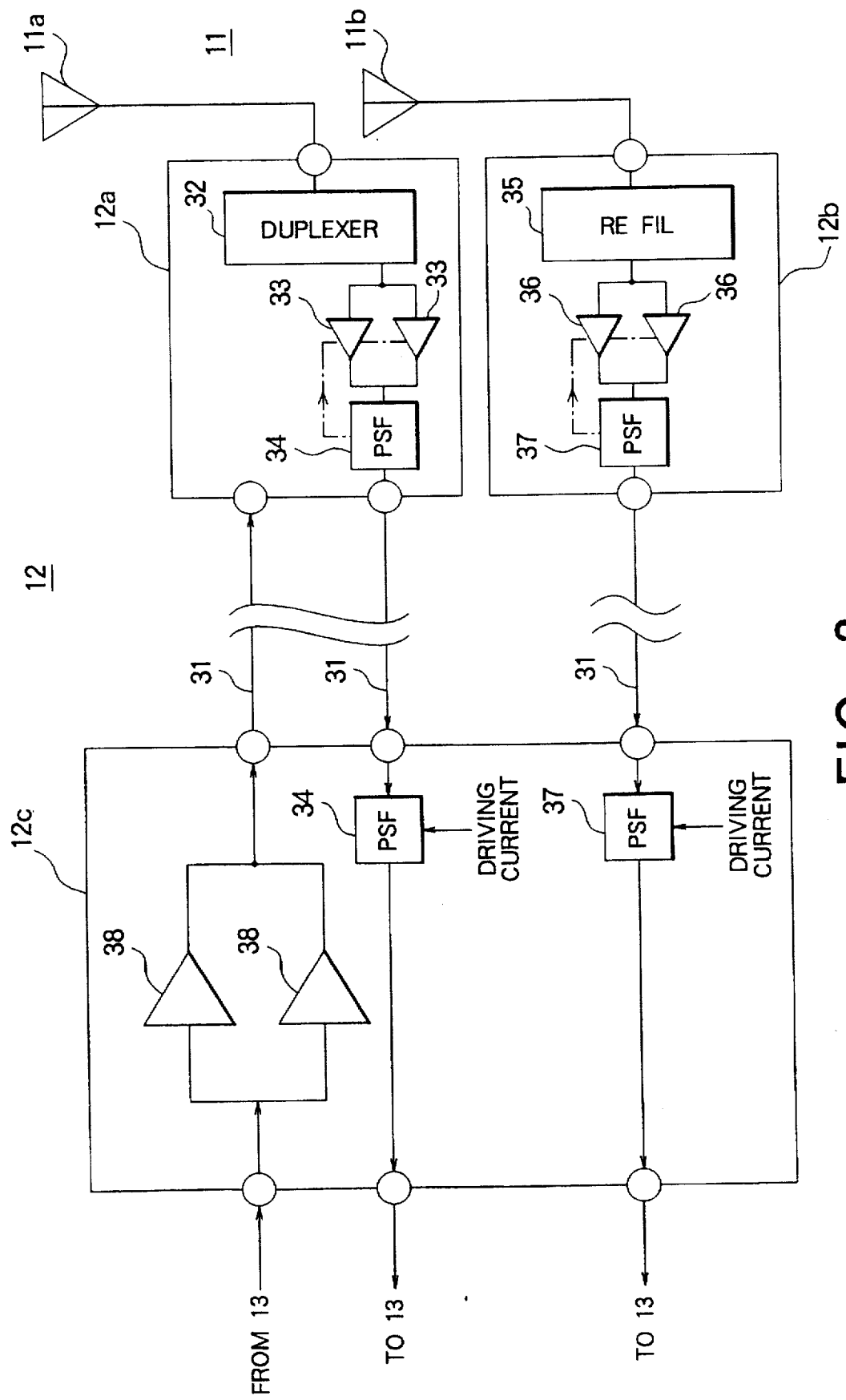
FIG. 3 is a block diagram of a common amplifier used in the conventional base station transmitter/receiver of FIG. 2.

Referring to FIGS. 1 through 3, a conventional base station transmitter/receiver will first be described in order to facilitate an understanding of the present invention.

The illustrated conventional base station transmitter/receiver is similar to that disclosed in "DIGITAL MOBILE COMMUNICATION" (Edited by Kuwahara, Science Newspaper Company in Japan, 1992, Sep.)

Generally, a base station is connected to a public exchange network through a control center as illustrated in FIG. 1 The base station comprises a plurality of antennas 11 (although a single antenna alone is illustrated), a common amplifier 12, and a modem (modulator-demodulator) 13. In the illustrated example, the control center comprises a speech processor 14, a base station controller 15, and an exchange 16. The exchange 16 includes a circuit controller 17. Alternatively, the speech processor 14 and the base station controller 15 may be included in the base station, as indicated by broken lines. The conventional base station transmitter/receiver is composed of the antennas 11, the common amplifier 12, and the modem 13.

Referring to FIG. 2, the modem 13 illustrated in FIG. 1 will be described in detail hereinunder. The modem 13 comprises RE (radio frequency) combiner/distributor units 21 connected through the common amplifier 12 to the antennas 11. A pair of the antennas 11 is oriented towards each sector of a cell covered by the base station in question. The RF combiner/distributor units 21 are equal in number to the sectors included in the cell A plurality of transmitter/receiver (TRX) shelves 22 are included in the modem 13. In each shelf 22, a shelf controller 23 and a plurality of transmitter/receiver (TRX) units are arranged so as to cooperate with the RF combiner/distributor units 21 in a manner to be described later The TRX units 24 correspond to carrier waves, respectively. Each of the TRX units 24 modulates an input transmission signal into a radio transmitting signal by the use of quadrature phase shift keying (QPSK) technique and demodulates a received signal into a demodulated signal. In addition, each of the TRX units 24 is also operable as a multiplexer and a demultiplexer in a known manner.

An interface 25 is interposed between the TRX shelves 22 and a synchronous terminal equipment unit 26. The other circuit elements will not be described any longer, because they are practically not concerned with this invention.

Referring to FIG. 3, the antennas 11 and the common amplifier 12 illustrated in FIG. 1 will be described in the following. In FIG. 3, it is noted that the antennas 11 and the common amplifier 12 are arranged in correspondence to each sector One of the illustrated antennas 11 comprises a transmitting/receiving antenna unit 11a and a diversity-receiving antenna unit 11b remote from the transmitting/receiving antenna 11a. From this fact, it is readily understood that a pair of receiving antennas 11a and 11b are arranged for each sector so as to execute space diversity reception. A space between both the antennas 11a and 11b is usually longer than a wavelength of a radio reception signal received by the antennas 11a and 11b.

The common amplifier 12 includes out-of-door portions 12a and 12b and an indoor portion 12c connected through feeders 31 to the out-of-door portions 12a and 12b.

Specifically, the out-of-door portion 12a has a duplexer 32 which is connected to the transmitting/receiving antenna 11a. First reception amplifiers 33 are connected to the duplexer 32 and are supplied with a driving electric current from the indoor portion 12c through a power separating filter (PSF) 34 and one of the feeders 31.

On the other hand, the out-of-door portion 12b comprises a reception filter 35 which is connected to the diversity-receiving antenna unit 11b. Second reception amplifiers 36 are connected to the reception filter (RE FIL) 35 and supplied with a driving electric current from the indoor portion 12c through a power separating filter 37 and another one of feeders 31. The indoor portion 12c comprises a plurality of transmission amplifiers 38.

In the conventional base station transmitter/receiver, the transmitting/receiving antenna 11 includes a single transmitting antenna unit, namely, 11a which is assigned to each sector so as to transmit a radio transmitting signal as mentioned above. The transmitting/receiving antenna unit 11a is fixed in a direction and has a directivity such that a whole of each sector is covered. The radio transmitting signal radiated from the transmitting/receiving antenna unit 11a reaches a boundary between the cell in question and the other adjacent cells.

If the same carrier frequency is assigned to two adjacent cells, a cochannel interference occurs at and around a boundary of the two adjacent cells.

In this connection, a plurality of different carrier frequencies are assigned to a plurality of cells in order to reduce the cochannel interference to a permissible range In other words, an identical one of the carrier frequencies is never assigned to the two adjacent cells but such an identical carrier frequency is practically assigned to cells which appear at each of four or seven cells. This results in degradation of utilization efficiency in carrier frequencies.

Figure 4:
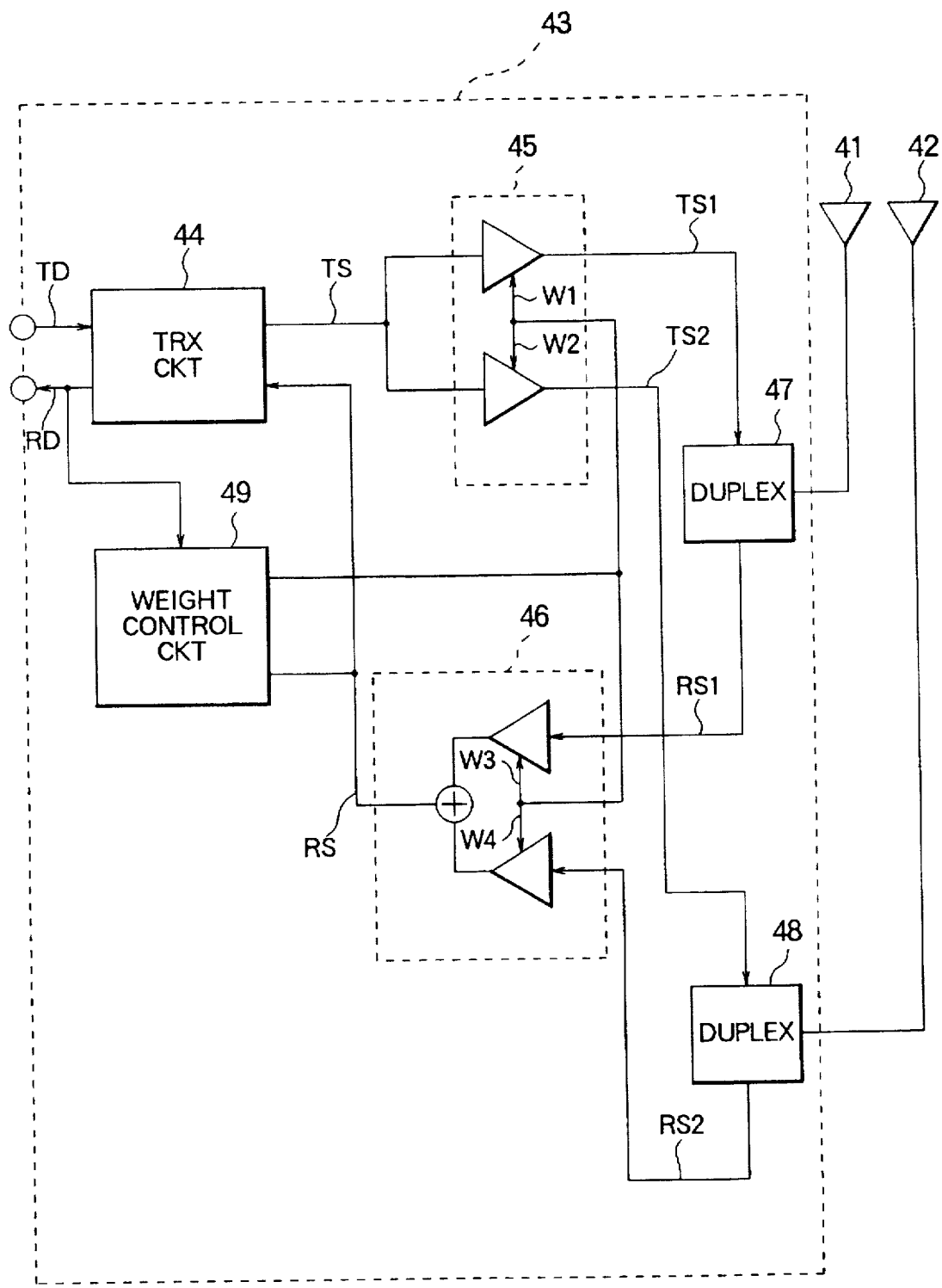
FIG. 4 is a block diagram of a base station according to a first embodiment of this invention.

Referring to FIG. 4 description will proceed to a base station transmitter/receiver according to a first embodiment of this invention. The base station transmitter/receiver comprises first and second antenna units 41 and 42 are used in common to transmission and reception and oriented towards the same sector of a single cell. The first and the second antenna units 41 and 42 may have either the same directivities or may have directivities different from each other.

In this connection, each of the first and the second units 41 and 42 may be identical with the conventional transmitting/receiving antenna unit 11a. Alternatively, each directivity of the first and the second antenna units 41 and 42 may be narrower in comparison with the directivity of the conventional transmitting/receiving antenna unit 11a. In this case, the first and the second antenna units 41 and 42 must be directed to different directions.

A signal processor 43 is connected to both the first and the second antenna units 41 and 42. The signal processor 43 processes an input transmission signal, such as transmission data signal TD, into first and second radio transmission signals TS1 and TS2 and processes first and second received signals RS1 and RS2 into an output reception signal, such as demodulated reception data signal RD in response to the received signals. Moreover, the signal processor 43 varies the directivities of the antenna units 41 and 42 and thereby controls a composite directivity formed by the varied directivities.

More particularly, the signal processor 43 comprises a transmission/reception (TRX) circuit 44 which modulates the transmission data signal TD into a modulated transmission signal TS and demodulates a reception signal RS into the reception data signal RD in a known manner. The transmission/reception (TRX) circuit 44 is similar in structure and operation to the TRX 24 illustrated in FIG. 2.

A controllable transmission weighting circuit 45 is included in the illustrated transmitter/receiver to weight the modulated transmission signal TS with each of first and second transmission weight coefficients w1 and w2 in a manner to be described later and to produce the first and the second weighted transmission signals TS1 and TS2. The first and the second antenna units 41 and 42 radiate the first and the second weighted transmission signals TS1 and TS2 as radio transmission signals within a single sector. On the other hand, the first and the second antenna units 41 and 42 receive the radio reception signals to produce the first and the second received signals RS1 and RS2.

A controllable reception weighting circuit 46 weights the first and the second received signal RS1 and RS2 with third and fourth reception weight coefficients w3 and w4 in a manner to be described later, respectively, into first and second weighted reception signals. The first and the second weighted reception signals are added to each other and produced as an added reception signal RS.

A first duplexer 47 is connected to the controllable transmission weighting circuit 45, the first antenna 41, and the controllable reception weighting circuit 46. The first duplexer 47 supplies the first weighted transmission signal TS1 and the first received signal RS1 to the first antenna 41 and the controllable reception weighting circuit 46, respectively.

A second duplexer 48 is connected to the controllable transmission weighting circuit 45, the second antenna 42, and the controllable reception weighting circuit 46. The second duplexer 48 is operable to supply the second weighted transmission signal TS2 and the second received signal RS2 to the second antenna 42 and the controllable reception weighting circuit 46, respectively.

In FIG. 4, a weight control circuit 49 is connected to the transmission/reception circuit 44, the controllable transmission weighting circuit 45, and the controllable reception weighting circuit 46. The weight control circuit 49 controls the first and the second transmission weight coefficients w1 and w2 and the third and the fourth reception weight coefficients w3 and w4 in response to the added reception signal RS and the reception data signal RD. When the first and second transmission weight coefficients w1 and w2 are controlled together with the third and the fourth reception weight coefficients w3 and w4, the directivities of the first and the second antenna units 41 and 42 are changed from one to another in dependency upon the Weight Coefficients w1 to w4 and thereby bring about variation of a composite directivity of the first and the second antenna units 41 and 42.

In this connection, the composite directivity can be divided into a receiving composite directivity and a transmitting directivity in the example illustrated.

Now, description will be made about deciding the first and the second transmission weight coefficients w1 and w2 and the third and the fourth reception weight coefficients w3 and w4. The weight control circuit 49 compares the added reception signal AS with the reception data signal RD and detects an error signal representative of a difference between the added reception signal RS and the reception data signal Rd. Then, the weight control circuit 49 carries out calculation so that a root-mean square of the error signal becomes a minimum and determines the third and the fourth reception weight coefficients w3 and w4 on the condition that $|w3|^2 + |w4|^2 = 1$. Therefore, the receiving composite directivity of the antenna units 41 and 42 is oriented towards a mobile station which radiates the radio reception signals in the sector in question.

The first and the second transmission weight coefficients w1 and w2 are decided so that the transmitting composite directivity of the first and the second antennas 41 and 42 may be made to correspond to the receiving composite directivity. If transmission characteristics of the antenna units 41 and 42, the duplexers 47 and 48, lines, and the remaining parts are identical with reception characteristics of the corresponding elements, the first and the second is transmission weight coefficients w1 and w2 may be given by:

$$w1 = w3^*, \text{ and}$$

$$w2 = w4^*,$$

where w3 and w4 represent coefficients which have the same amplitudes as the reception weight coefficients w3 and w4 and inverse phases relative to w3 and w4.

In a practical base transmitter/receiver, the transmission characteristics are not always identical with the reception characteristics. In this event, the transmission and the reception characteristics must be measured to correct the first and the second transmission weight coefficients w1 and w2 in advance.

The weight control circuit 49 may decide the reception weight coefficients w3 and w4 in response only to the added reception signal RS. Under the circumstances, calculation may be executed such that power of the added reception signal RS becomes a maximum. Besides, the weight control circuit 49 may decide the reception weight coefficients w3 and w4 in response only to the added reception signal RS by calculating a maximum value of a power ratio of a desired signal to an interference signal of the added reception signal RS At any rate, the transmitting composite directivity of the first and the second antennas 41 and 42 is oriented towards the mobile station or stations located in the sector.

The composite transmitting or receiving directivity depends on a space or distance between the first and the second antenna units 41 and 42. When the space between the antenna units 41 and 42 is shorter than the wavelength of the carrier wave, the composite transmitting or receiving directivity is widened as compared with the case where the space is longer than the wavelength of the carrier wave. The wider composite transmitting or receiving directivity makes it possible to slowly trace the mobile station or stations. In other words, such a wide composite directivity dispenses with high speed tracing of the mobile station. This shows that the weight control circuit 49 may not change the weight coefficients w1 through w4 at a high speed.

Figure 5:
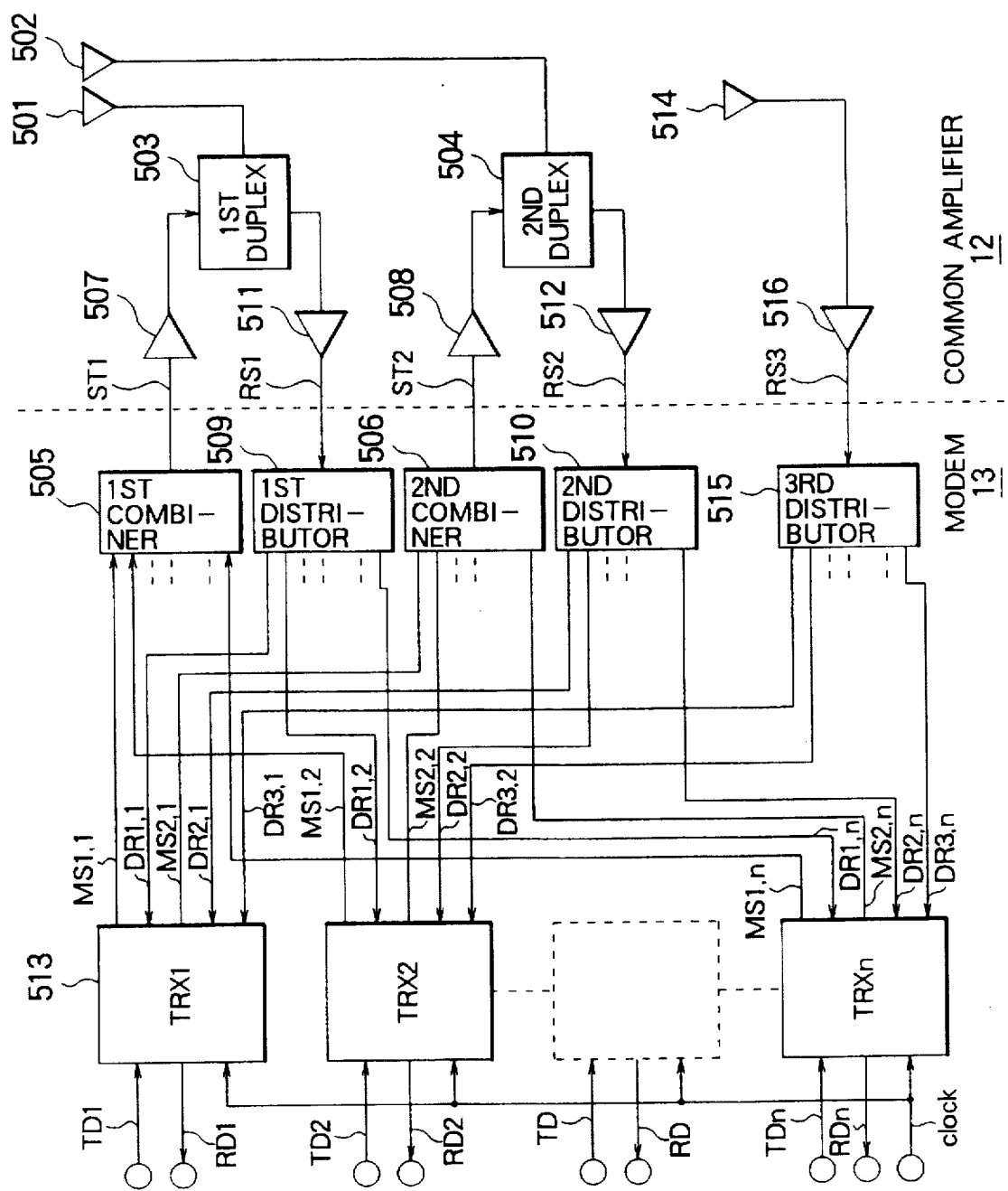
FIG. 5 is a block diagram of a base station transmitter/receiver according to a second embodiment of this invention.
Figure 6:
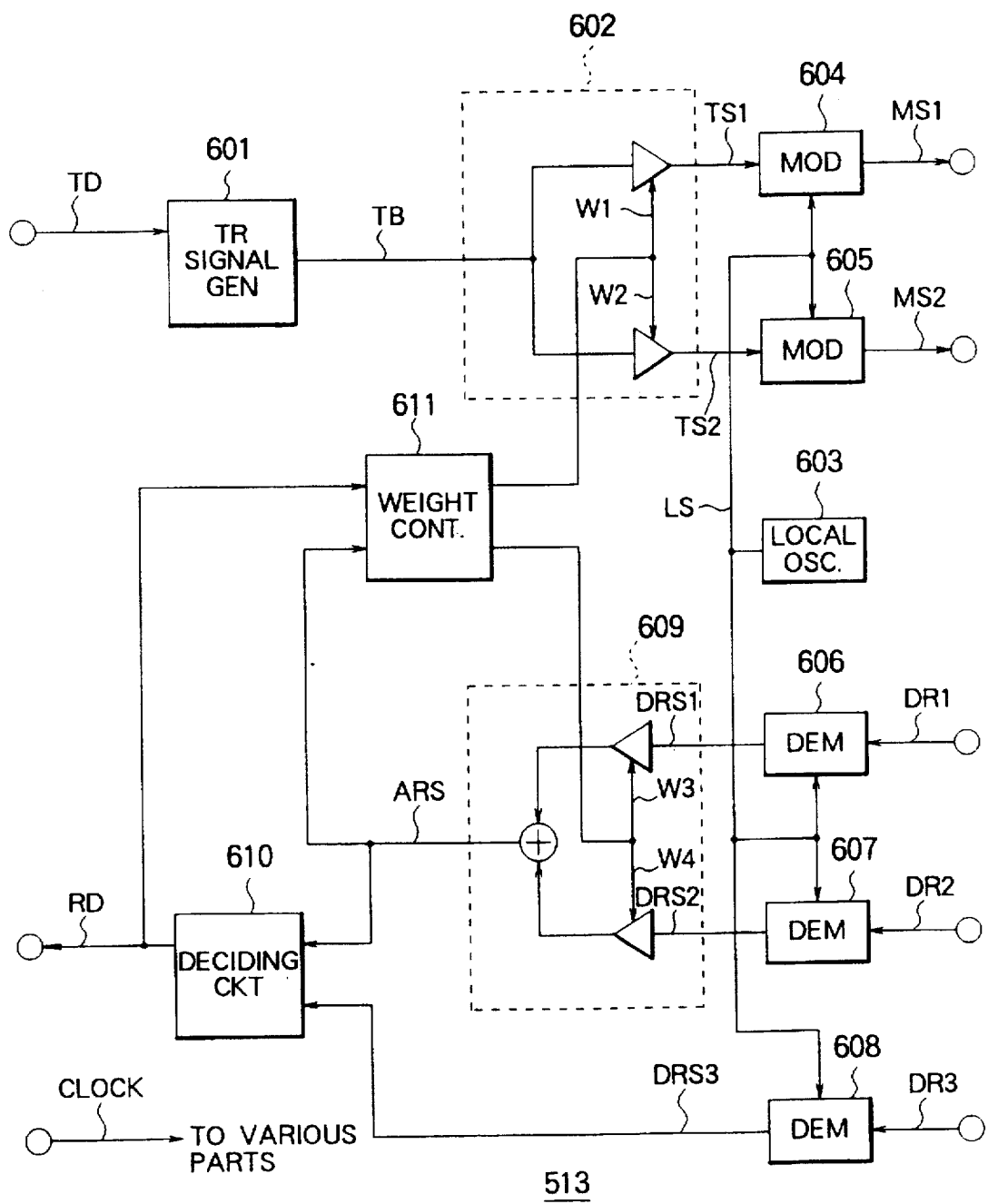
FIG. 6 is a block diagram of a transmit/receive exchanger of the base station transmitter/receiver of FIG. 5.

Referring to FIGS. 5 and 6, description will be directed to a base station transmitter/receiver according to a second embodiment of this invention.

In FIG. 5, the base station transmitter/receiver comprises first and second antenna units 501 and 502 both of which are use in common to transmission and reception illustrated in FIG. 3. As described in conjunction with the first embodiment, the first and the second antenna units 501 and 502 may have the same directivities and may be directed to the same direction. Alternatively, the first and the second antenna units 501 and 502 may exhibit directivities different from each other in a sector. In this event, each of the directivities of the first and the second antenna units 501 and 502 may be narrowes than the directivity of the conventional antenna unit 11a. In this case, the first and the second antenna units 501 and 502 must be directed to different directions. First and second duplexers 503 and 504 are connected to the first and the second antenna units 501 and 502, respectively. This means that each of the first and the second antenna units 501 and 502 are used for transmission and reception, as mentioned above. First and second combiners 505 and 506 are connected to the first and the second duplexers 503 and 504 through amplifiers 507 and 508, respectively. First and second distributors 509 and 510 are also connected to the first and the second duplexers 503 and 504 through amplifiers 511 and 512, respectively.

A plurality of TRX units 513 are connected to the first and the second combiners 505 and 506 and the first and the second distributors 509 and 510. In the illustrated example, first through n-th TRX units 513 are included in the base station transmitter/receiver, where n is a natural number.

The illustrated base station transmitter/receiver further comprises a diversity-receiving antenna 514 and a third distributor 515 which is connected to the diversity receiving antenna unit 514 through an amplifier 516 and which is connected to the plurality of TRX units 513.

Each TRX unit 513 produces first and second modulated transmission signals MS1.k and MS2.k, where k is an integer variable between 1 and n, both inclusive The first combiner 505 combines the first modulated transmission signals MS1.1, MS1.2, . . . , MS1.n given from the respective TRx units 513 to produce a first combined transmission signal ST1. Similarly, The second combiner 506 combines the second modulated transmission signals MS2.1, MS2.2, . . . , MS2.n given from the respective TRX units 513 to produce a second combined transmission signal ST2.

The first distributor 509 distributes a first received signal Rs1 carried by carrier frequencies from the first antenna 501 into first distributed reception signals DR1.1, DR1.2, . . . , and DR1.n, equal in number to n. The second distributor 510 distributes a second received signal RS2 carried by carrier frequencies from the second antenna 502 into second distributed reception signals DR2.1, DR2.2, . . . , and DR2.n. The third distributor 515 distributes a third received signal RS3 carried by carrier frequencies from the diversity-receiving antenna unit 514 into third distributed reception signals DR3.1, DR3.2, . . . , and DR3.n.

In FIG. 6, each of the TRX units 513 comprises a transmission wave signal (TR) generator 601 which generates a transmission wave signal TB in the form of a complex baseband signal, in response to a transmission data signal TD. This shows that the transmission wave signal TB may be specified by complex numbers. A controllable transmission weighting circuit 602 weights the transmission wave signal TB with each of first and second transmission weight coefficients w1 and w2 to produce first and second weighted transmission signals TS1 and TS2. In other words, the controllable transmission weighting circuit 602 multiplies the complex numbers by each other. The first and the second transmission weight coefficients w1 and w2 will be mentioned later.

A local oscillator 603 produces a local oscillator frequency signal LS. First and second modulators 604 and 605 are connected to the controllable transmission weighting circuit 602 and the local oscillator 603 to modulate the first and the second weighted transmission signals TS1 and TS2 in accordance with the local oscillator frequency signal LS into the first and the second modulated transmission signals MS1 and MS2;

First and second demodulators 606 and 607 are connected to the local oscillator 603 to demodulate the first and the second distributed signals DR1 and DR2 in accordance with the local oscillator frequency signal LS into first and second demodulated reception signals DRS1 and DRS2 which may be baseband signals specified by complex numbers.

A third demodulator 608 is connected to the local oscillator 603 to demodulate the third distributed signals DR3 in accordance with the local oscillator frequency signal LS into a third demodulated reception signal DRS3.

A controllable reception weighting circuit 609 is connected to the first and the second demodulator 606 and 607. With this structure, the controllable reception weighting circuit 609 weights the first and the second demodulated reception signals DRS1 and DRS2 with third and fourth reception weight coefficients w3 and w4, respectively, into first and second weighted reception signals to add the first and the second weighted reception signals to each other and to produce an added reception signal ARS. In this case, the controllable reception weighting circuit 609 multiplies the complex numbers by each other like the controllable transmission weighting circuit 602.

A deciding or detecting circuit 610 is connected to both the third demodulator 608 and the controllable reception weighting circuit 609 to synthesize or combine the third demodulated reception signal DRS3 with the added reception signal ARS and to produce a reception data signal RD. Operation of the deciding circuit 610 may be called a diversity-synthesizing operation or a diversity-combination operation.

A weight control circuit 611 is connected to controllable transmission weighting circuit 602, the controllable reception weighting circuit 609, and the deciding circuit 610. The weight control circuit 611 controls the first and the second transmission weight coefficients w1 and w2 and the third and the fourth reception weight coefficients w3 and w4 in response to the added reception signal ARS and the reception data signal RD. The other circuit elements will be omitted because they are substantially equivalent to those of the conventional base station transmitter/receiver.

The first and the second transmission weight coefficients w1 and w2 and the third and the fourth reception weight coefficients w3 and w4 are decided in a manner to be described hereinunder. The weight control circuit 611 compares the added reception signal ARS with the reception data signal RD and detects an error signal. Then, the weight control circuit 611 carries out calculation so that a root-means square of the error signal becomes a minimum and determines the third and the fourth reception weight coefficients w3 and w4, on the condition that $|w3|^2 + |w4|^2 = 1$. Therefore, a receiving composite directivity is changed and oriented towards a mobile station which is being located or running in the sector. The receiving composite directivity is thus individually varied by each TRX unit.

The first and the second transmission weight coefficients w1 and w2 are decided so that a transmitting composite directivity of the first and the second antennas 501 and 502 may become substantially equivalent to the receiving composite directivity.

The weight control circuit 611 may decide the reception weight coefficients w3 and w4 in response only to the added reception signal ARS in the manner mentioned is in conjunction with the first embodiment. Likewise, the weight control circuit 611 may decide the reception weight coefficients w3 and w4 in response only to the added reception signal ARS by maximizing a power ratio of a desired signal to an interference signal of the added reception signal ARS.

Therefore, the transmitting composite directivity of the first and the second antenna units 501 and 502 is oriented towards the mobile stations which are being located within the sector. Thus, the transmitting composite directivity is changed by each TRX unit.

The composite directivity depends on a space between the first and the second antenna units 501 and 502. When the space is shorter than the wavelength of the carrier wave, the composite directivity is widened as compared with the case where the space is longer than the wavelength of the carrier wave. This means that each of the composite directivities may not be quickly changed, like in the first embodiment and that the weight control circuit 611 may not change the weight coefficients w1 through w4 at a high speed. On the other hand, as the space becomes short, a diversity gain becomes small. Therefore, the diversity receiving antenna unit 514 may be remote from the first and second antennas 501 and 502.

While this invention has thus far been described in conjunction with a few embodiments thereof, it will readily be possible for those skilled in the art to put this invention into practice in various other manners. For example, more than two antenna units may be located within each sector to carry out both transmission and reception.

What is claimed is:

1. A base station used in a cellular system and installed in a cell of a service area, the cell being divided into a Plurality of sectors, said base station comprising:

a transmitter/receiver designated for a selected sector for transmitting radio transmission signals in said selected sector and receiving radio reception signals in said selected sector to produce an output reception signal;

a plurality of directivity antennas which are oriented in said selected sector for radiating said radio transmission signals and for receiving said radio reception signals to produce received signals, each of said plurality of directivity antennas being connected to said transmitter/receiver unit and each of said directivity antennas receiving said radio transmission signal from said transmitter/receiver unit;

first controllable weighting means for weighting said input transmission signal with each of transmission weight coefficients determined in relation to said radio reception signals to produce weighted transmission signals as said radio transmission signals;

second controllable weighting means for weighting said received signals with reception weight coefficients determined in relation to said radio reception signals into weighted reception signals to add said weighted reception signals to one another and to produce an added signal; and weight control means connected to said first weighting means and said second weighting means for controlling said transmission weight coefficients and said reception weight coefficients in response to said added signal;

wherein composite transmission and reception directivity of said plurality of directivity antennas is varied depending on the transmission weight coefficients and reception weight coefficients, respectively.

2. A base station as claimed in claim 1, wherein said weight control means controls said reception weight coefficients so that power of said added signal becomes a maximum, said weight control means further controlling said transmission weight coefficients so that said composite directivity on transmission becomes substantially equal to the composite directivity on reception.

3. A base station as claimed in claim 1, wherein said weight control means controls said reception weight coefficients so that a power ratio of a desired signal to an interference signal of said added signal becomes minimum, said weight control means further controlling said transmission weight coefficients so that said composite directivity on transmission becomes substantially equal to said composite directivity on reception.

4. A base station transmitter/receiver as claimed in claim 1, said base station transmitter/receiver further comprising a diversity-receiving antenna for receiving a radio reception signals to produce a diversity received signal; and deciding means connected to said second controllable weighting means and said diversity receiving antenna for diversity synthesizing said added signal and said diversity-received signal to produce a reception data signal;

wherein said weight control means compares said added signal with said reception data signal to produce an error signal and controls said reception weight coefficients in order to minimize a mean square value of said error signal, said weight control means further controlling said transmission weight coefficients so that said composite directivity on transmission becomes substantially equal to said composite directivity on reception.

5. A base station transmitter/receiver, used in a cellular system and installed in each cell of a service area, each cell being divided into a plurality of sectors, said base station transmitter/receiver transmitting radio transmission signals in each sector in response to an input transmission signal and receiving radio reception signals in each sector to produce an output reception signal, said base station transmitter/receiver comprising:

a plurality of antennas which are oriented in each sector for radiating said radio transmission signals and for receiving said radio reception signals to produce received signals; and signal processing means connected to said antennas for processing said received signals into said output reception signal and for processing said input transmission signal into said radio transmission signals in response to said received signals to vary said directivities of said antennas and to thereby control a composite directivity formed by the varied directivities;

wherein said signal processing means comprises:
first controllable weighting means for weighting said input transmission signal with each of transmission weight coefficients determined in relation to said radio reception signals to produce weighted transmission signals as said radio transmission signals;

second controllable weighting means for weighting said received signals with reception weight coefficients determined in relation to said radio reception signals into weighted reception signals to add said weighted reception signals to one another and to produce an added signal; and weight control means connected to said first weighting means and said second weighting means for controlling said transmission weight coefficients and said reception weight coefficients in response to said added signal, said base station transmitter/receiver further comprising a demodulator connected to said second controllable weighting means and said weight control means for demodulating said added signal into said output reception signal to said weight control means, wherein said weight control means for controlling said transmission weight coefficients and said reception weight coefficients in response to both said added signal and said output reception signal.

6. A base station transmitter/receiver as claimed in claim 5, wherein said weight control means compares said added signal with said demodulated signal to produce an error signal and controls said reception weight coefficients in order to minimize a mean square value of said error signal, said weight control means further controlling said transmission weight coefficients so that said composite directivity on transmission becomes substantially equal to said composite directivity on reception.

7. A base station used in a cellular system and installed in a cell of a service area, said base station comprising:

a plurality of transmitter/receiver units transmitting radio transmission signals and receiving radio reception signals to produce an output reception signal;

first controllable weighting means for weighting said radio transmission signal with each of transmission weight coefficients determined in relation to said radio reception signals to produce weighted transmission signals;

two directivity antennas each of which connected to each of said plurality of transmitter/receiver units for radiating said weighted transmission signals corresponding to said radio transmission signals of each of said transmitter/receiver units, and for receiving said radio reception signals to produce received signals;

second controllable weighting means for weighting said received signals with reception weight coefficients determined in relation to said radio reception signals into weighted reception signals to add said weighted reception signals to one another and to produce an added signal;

duplexers connected to said first weighting means, said antennas, and said second weighting means for supplying said weighted transmission signals and said received signals to said antennas and said second weighting means, respectively; and weight control means connected to said first weighting means and said second weighting means for controlling said transmission weight coefficients and said reception weight coefficient in response to said added signal to change the directivities of said antennas in dependency upon said radio reception signals and to thereby vary a composite directivity of said antennas.

8. The base station of claim 7, further comprising a diversity receiving antenna connected to each of said transmitter/receiver units.

9. A base station used in a cellular system and installed in a cell of a service area, the cell being divided into a plurality of sectors, said base station comprising:

a transmitter/receiver designated for a selected sector for transmitting a first radio transmission signal in said selected sector and receiving a first radio reception signal in said selected sector to produce a first output reception signal;

a plurality of antennas which are oriented in said selected sector for radiating a combined radio transmission signal and for receiving a combined radio reception signal to produce received signals, each of said plurality of antennas being connected to said transmitter/receiver unit and each of said antennas receiving said first radio transmission signal from said transmitter/receiver unit; and signal processing means connected to said antennas for processing said received signals into said first reception signal and a second reception signal, and for processing said first transmission signal and a second transmission signal into said combined radio transmission signal, in response to said received signals, to vary transmission directivities of said antennas and to thereby control a composite directivity formed by the varied directivities;

wherein said base station further comprises a second receiver/transmitter unit connected to each of said plurality of antennas and transmits said second radio transmission signal and receives said second radio reception signal to produce a second output reception signal.

* * * * *